US009495785B2

(12) United States Patent
Ito (10) Patent No.: US 9,495,785 B2
(45) Date of Patent: Nov. 15, 2016

(54) RENDERING ILLUSTRATIONS USING A TWO-DIMENSIONAL RENDERING ENGINE

(71) Applicant: Adobe Systems Incorporated, San Jose, CA (US)

(72) Inventor: Daichi Ito, Los Gatos, CA (US)

(73) Assignee: Adobe Systems Incorporated, San Jose, CA (US)

( * ) Notice: Subject to any disclaimer, the term of this patent is extended or adjusted under 35 U.S.C. 154(b) by 76 days.

(21) Appl. No.: 14/515,295

(22) Filed: Oct. 15, 2014

(65) Prior Publication Data

US 2016/0110888 A1    Apr. 21, 2016

(51) Int. Cl.
*G06T 11/00* (2006.01)
*G06T 11/60* (2006.01)

(52) U.S. Cl.
CPC .................................. *G06T 11/60* (2013.01)

(58) Field of Classification Search
None
See application file for complete search history.

(56) References Cited

U.S. PATENT DOCUMENTS

| 8,773,433 B1 * | 7/2014 | Smyrl | G06T 15/506 345/420 |
| 2004/0263512 A1 * | 12/2004 | Santodomingo | G06T 15/00 345/428 |

* cited by examiner

*Primary Examiner* — Edward Martello
(74) *Attorney, Agent, or Firm* — Wolfe-SBMC (57) ABSTRACT

A rendering engine is described that implements rendering techniques to render 2D illustrations by assigning light values to objects that define an illustration 'inside out'. Light values may be assigned to a first object and subsequently inherited by objects that are hierarchly related to the first object. The light values assigned to the objects may include a light variable that depends on a relationship between the two or more groups of objects. Various rendering techniques may be employed by the rendering engine to render illustrations that are both customizable and realistic in appearance.

20 Claims, 8 Drawing Sheets

RENDERING ILLUSTRATIONS USING A TWO-DIMENSIONAL RENDERING ENGINE

BACKGROUND

Users increasingly utilize smarter tools that produce illustrations in order to meet project deadlines. For example, a commercial artist or graphic designer may access a tool such as a user interface that enables them to produce an illustration more quickly. In some cases, the commercial artist or graphic designer need to customize the computer generated illustration so that it meets the expectation of their clients when displayed as part of a project.

To render illustrations, conventional techniques typically rely on three-dimensional (3D) rendering in order to support the realistic look of the illustration. Three-dimensional rendering, however, may be time consuming and computationally intensive, particularly when rendering illustrations that appear realistic.

SUMMARY

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

Techniques are described that may be utilized to render two-dimensional (2D) illustrations by calculating a probability of light for objects furthest from a light source prior to assigning light values to objects closer to the light source. In one or more implementations, objects closer to the light source inherit the light values assigned to the further objects and are assigned a light variable. The light variable assigned to the closer objects depends on behaviors that describe a relationship between the two groups of objects. In this way, the probability of light for objects included in an illustration may be calculated and/or assigned 'inside out', instead of using conventional rendering techniques that calculate the phenomena 'outside' of object, ray tracing or ray casting from a light source. By calculating light values for the 'inner' objects and assigning light values to a generation of objects derived from the inner objects, illustrations may be efficiently rendered that are both customizable and realistic in appearance.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

To render realistic illustrations, conventional techniques often rely on 3D rendering, which may be time consuming and computationally intensive, particularly when rendering illustrations that appear photo realistic. For example, a user that wishes to insert a background illustration into a project often spends time designing the background object and/or waiting while the background illustration is rendered. Thus, conventional techniques are not well suited to enabling users, such as graphic artists, to efficiently complete projects through use of quickly produced illustrations.

A rendering engine is described that is configured to implement rendering techniques to render 2D illustrations by assigning light values for objects furthest from a light source and deriving light values of objects closer to the light source based on those assigned to their parent/inner object and their relationship. In one implementation, objects closer to the light source inherit the light values assigned to the parent objects and are assigned a light variable that depends on a relationship between the two groups of objects. In this way, the probability of light for objects included in an illustration may be calculated and/or assigned 'inside out'. By calculating light values for the 'inner' objects and assigning light values to a generation of objects derived from the inner objects, illustrations may be efficiently rendered that are both customizable and realistic in appearance. The rendering techniques described herein may thus avoid time consuming and computationally intensive 3D rendering algorithms or calculations thereby improving a user experience.

By way of example and not limitation, rendering techniques may be described in relation to rendering a particular type of illustration although many type of illustrations having a hierarchy of related objects may be rendered using the techniques described herein. For example, a graphic designer or illustrator may desire to insert a tree illustration into a project. Wanting to complete the project quickly, the graphic designer turns to a tool that is capable of producing the tree illustration accurately and quickly while requiring minimal input. The graphic designer may provide the tool with an indication of a tree type and obtain the tree illustration with minimal delay as compared to digitally painting a tree, customizing a photo of a tree, or waiting for 3D calculations to complete rendering the tree. The tree illustration may be inserted in a project, stored in memory, output to a display device, and/or customized via a graphical user interface.

Rendering an illustration may depend upon assigning light values to objects that define an illustration in a variety of ways. Following the tree example, light values may be assigned to a trunk object such that light values assigned to a branch object may be a combination of the light values assigned to the trunk object and a light variable representing the branch's qualification (size, location, direction, and/or randomization). Additionally or alternatively, light values for a leaf object may be calculated and/or assigned based on the light values assigned to the branch object and the leaf's qualification. In this way, light values for an object may be inherited from another object. The light values may be indicative of a level of light for the particular object. For example, light values may include a brightness value and/or a shadow value. An object's qualification may determine how much light/shadow value they inherit from their parents. In one or more implementations, the object inherits more or less light value because of its qualification (e.g., location) thus representing ambient occlusion (e.g., a level of exposure to ambient lighting), highlight (e.g., areas of an object that receive the strongest illumination), and/or form shadow e.g., a shadow included on the object. Representing ambient occlusion, highlight, and/or form shadow by calculating the light values in this example may be performed without use of 3D algorithms or a 3D rendering engine.

A light variable may be calculated for an object based at least in part on behaviors that describe a relationship between the object and another object or a group of objects. In some implementations, object behaviors corresponding to a particular object may be ascertained when calculating a light variable. Object behaviors may, for example, be based on how the object relates to another object in real-life e.g., a naturally occurring environment. For instance, behaviors or naturally occurring tendencies of the objects in real-life may be used to describe a relationship between the objects to be included in an illustration. In this implementation, a combination of behaviors may be used to calculate the light variable which in turn may be combined with inherited light values of another object to represent a level of light for the particular object.

Continuing with the tree example, a light variable assigned to a branch object may depend on behaviors that describe a relationship between the branch object and a trunk object. For instance, the behaviors may include identifying a length, a location, and/or an orientation of the branch object relative of the trunk object. By calculating the light variables for various objects that collectively represent an illustration to be rendered, the probability of light for objects included in an illustration may be calculated 'inside out'. Further discussion of these and other examples may be found in the following sections.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures.

Example Environment

Figure 1:
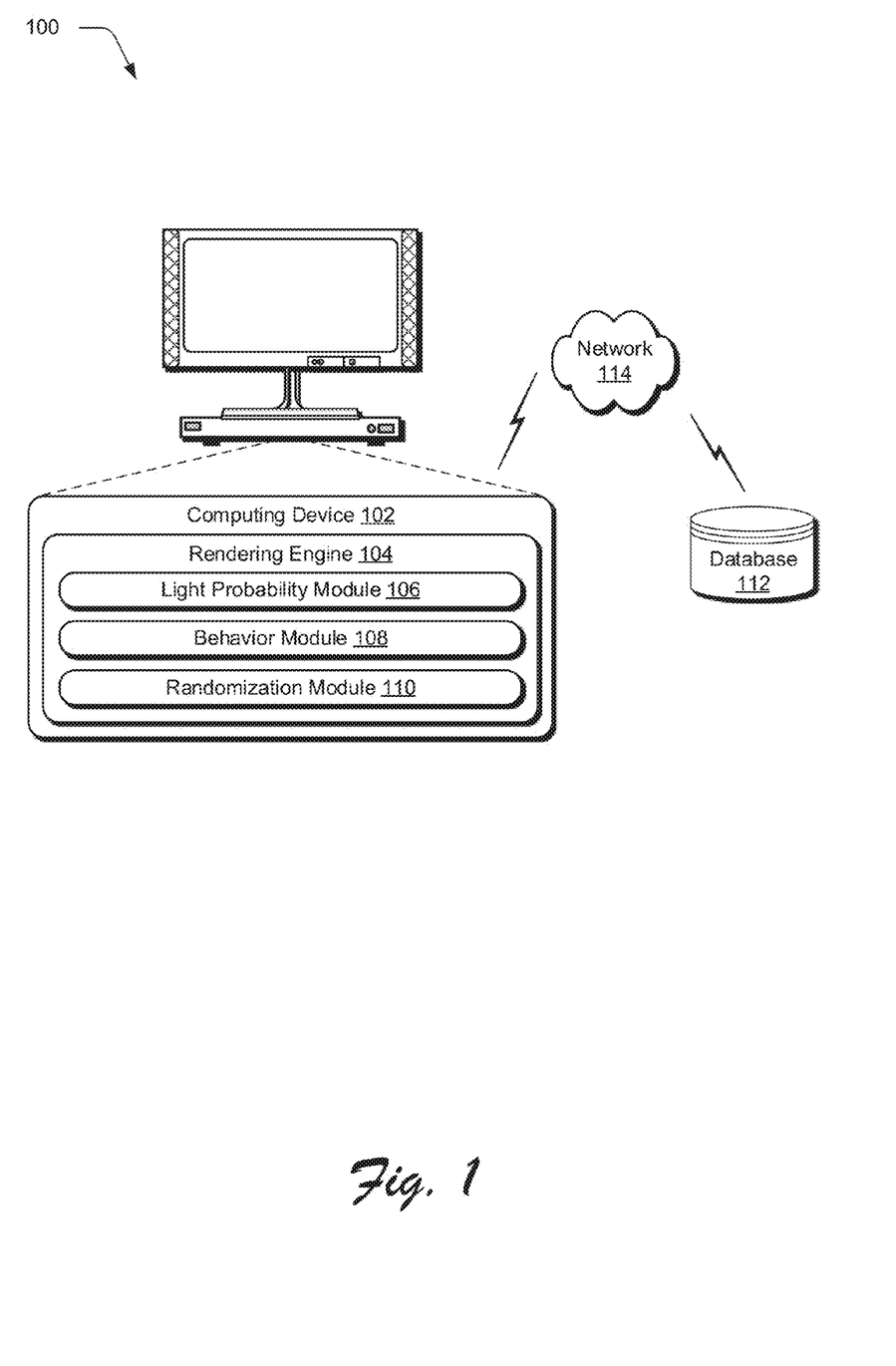
FIG. 1 is an illustration of an environment in an example implementation that is operable to employ the rendering techniques described herein.

FIG. 1 is an illustration of an environment 100 in an example implementation that is operable to employ the rendering techniques described herein. The illustrated environment 100 includes a computing device 102, a rendering engine 104 that includes a light probability module 106, an object behavior module 108, and a randomization module 110, and a database 112 which may be configured in a variety of ways.

The computing device 102, for instance, may be configured as a desktop computer, a laptop computer, a mobile device (e.g., assuming a handheld configuration such as a tablet or mobile phone), and so forth. Thus, the computing device 102 may range from full resource devices with substantial memory and processor resources (e.g., personal computers, game consoles) to a low-resource device with limited memory and/or processing resources (e.g., mobile devices). Additionally, although a single computing device 102 is shown, the computing device 102 may be representative of a plurality of different devices, such as multiple servers utilized by a business to perform operations "over the cloud" as further described in relation to FIG. 7.

The rendering engine 104 is illustrated as including the light probability module 106, the object behavior module 108, and a randomization module 110. In one implementation, the rendering engine 104 is representative of functionality that is operable to employ techniques for rendering 2D images (e.g., 2D illustrations that include multiple objects that collectively define the illustrations) by assigning light values for objects furthest from a light source and deriving light values of objects closer to the light source based at least in part on those assigned to objects further from the light source. By way of example and not limitation, the rendering engine 104 may be configured to render an object, such as a tree, that appears realistic (e.g., resembles a 3D image and/or an object occurring in the real-world) and is customizable e.g., may be manipulated to change characteristics of the rendered object.

Figure 3A:
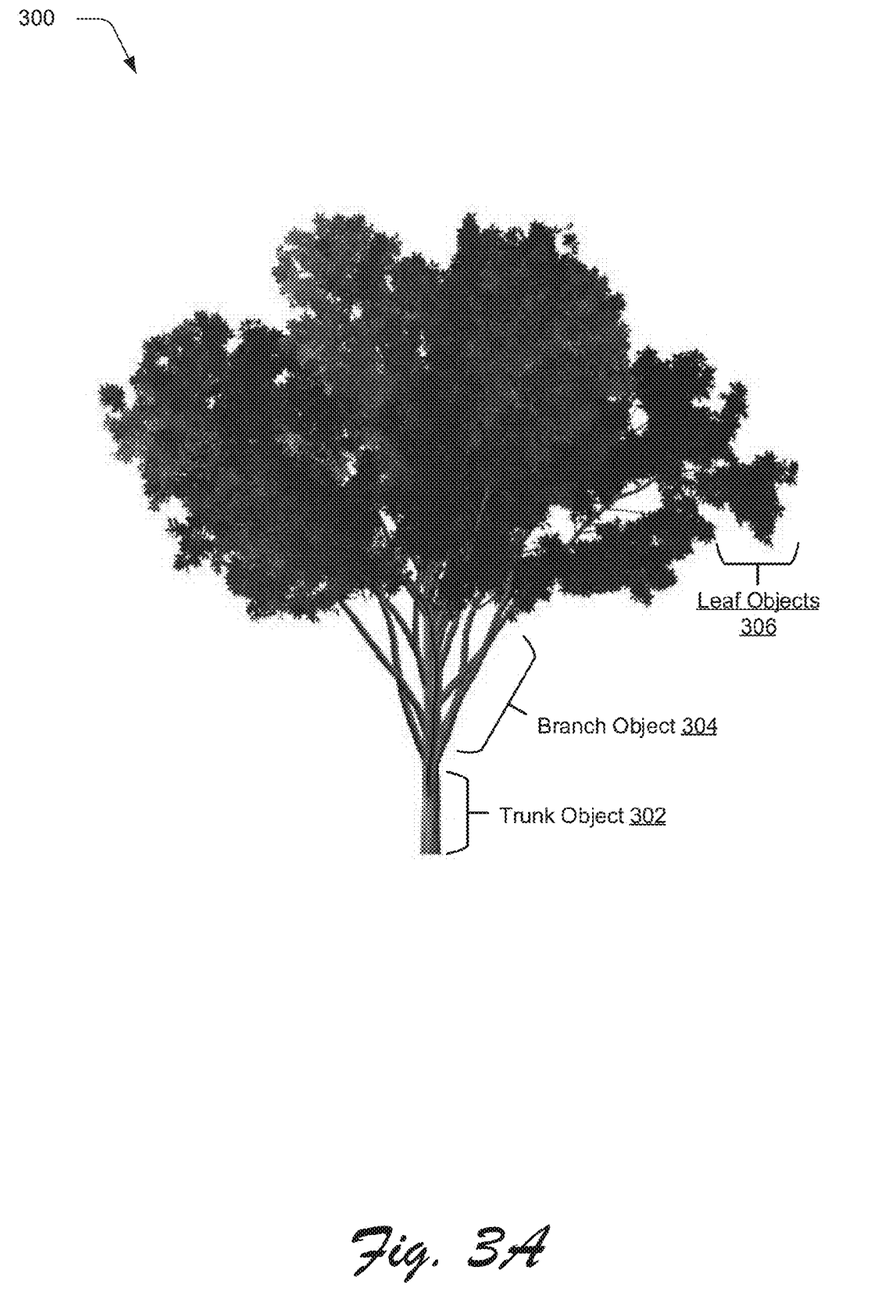
FIG. 3A depicts an example illustration rendered via a rendering engine by employing techniques described herein.

Light values assigned to the branch objects 304 may depend on a combination of behaviors. Behaviors may be determined using a variety of different operations. Examples of these operations may include identifying characteristics of the subject matter to be rendered. For instance, when the subject matter to be rendered is a tree, the following characteristics may be identified: a tree has one or more trunks, the trunk becomes thinner as it leaves the ground, a trunk has multiple branches that do not have leaves, some branches (and sub-branches that leave the branch, not shown) are straight while others change direction, branches attached to the trunk tend to have multiple sub-branches and no leaves, and the like. These characteristics may form the behaviors that are usable to determine a light value and/or a light variable.

In at least some implementations, the rendering engine 104 may be configured as a 2D rendering engine. The rendering engine 104, for instance, may be configured to perform 2D algorithms and calculations that are usable to render a 2D image or illustration. The rendering engine 104 may also be configured to support 3D rendering. Regardless of how configured, however, time consuming and computationally intensive 3D rendering algorithms or calculations may be avoided by the rendering engine 104 as further described below.

The light probability module 106 is representative of functionality that is configured to assign or calculate values that represent a probability of light for various objects (e.g., image objects) that collectively represent an illustration to be rendered. For instance, the light probability module 106 may calculate and assign light values for a particular object or a set of objects. In some implementations, a first object or set of objects may be assigned one or more values (e.g., a brightness value and/or a shadow value) based on an objects' qualification (e.g., size, location, orientation, and/or direction) to cause ambient occlusion, highlight, and/or form shadow for each object. In at least one implementation, the one or more values are assigned to the first object or set of objects based on two light sources. For instance, the one or more values may be assigned based on a basic value associated with a first light source that illuminates the entire object (i.e., ambient light) and a location value associated with a second light source that illuminates some portions of the object differently. Here, the first light source may be non-directional such that illumination from the first light source affects the entire object or set of objects while the second light source may, for instance, be a directional light source. For example, the second light source may include a sun, moon, or other light source that causes illumination to reach the object or set of objects from a particular direction.

Additionally or alternatively, the light probability module 106 may be configured to assign or calculate values that represent a probability of light for a second object or set of objects. For instance, one or more values (e.g., a brightness value and/or a shadow value) may be assigned for the second object. The one or more values may be assigned to the second object or set of objects based on the value(s) assigned to a first set of objects. In this example, the second set of objects is closer to a light source (e.g., the second light source) relative to the first set of objects and inherits the value(s) assigned to the to a first set of objects plus a light variable. The light variable depends on behaviors that describe a relationship between the two groups of objects. While the second light source is usable for assigning values to the first set of objects, a direction and/or distance from the second set of objects (which are closer relative to the first set of objects) to the second light source is not required to assign values to the second set of objects. Further values may be assigned to additional objects or sets of objects to represent a probability of light for each object or set of objects in a hierarchy or related objects. Assigning values that represent a probability of light to objects is further described in relation to FIGS. 2-6.

As illustrated in FIG. 1, the rendering engine 104 further includes the object behavior module 108 which is representative of functionality to ascertain behaviors that identify and/or describe a relationship between the objects that collectively represent the illustration to be rendered. Behaviors may be ascertained using a variety of different operations. Examples of these operations may include comparing a length, a location, and/or an orientation of an object relative to another object. In some instances, image objects may share a common behavior.

A combination of the ascertained behaviors may contribute to the calculated values that represent ambient occlusion, highlight, and/or form shadow. The behaviors of an object may be based on how the object relates to another object in real-life e.g., a naturally occurring environment. For instance, behaviors or naturally occurring tendencies of the objects in real-life may be used to describe a relationship between the objects to be included in an illustration. In this way, behaviors may vary according to a type of illustration to be rendered. In one implementation, a combination of the behaviors contributes to the calculated values that represent ambient occlusion, highlight, and/or form shadow. Assigning values based on behaviors is further described in relation to FIGS. 2-6.

The randomization module 110 is representative of functionality that is configured to assign a randomization value to objects that define an illustration and/or assign a randomization value to the illustration itself. The randomization value may cause shape and/or light of the corresponding object to vary by a threshold amount such that one or more objects appear differently when rendered. As a result, when an illustration is output for display on a display device, the different randomization values may avoid, for instance, uniform color, shape, and/or orientation among the objects that may lead to the illustration appearing less realistic. In this way, the different randomization values may serve to mimic the behavior of the objects found in their natural environment e.g., none of the branch shape should be identical. In some implementations, the randomization module 110 may assign a randomization value responsive to receiving an indicator via an application or user interface to randomize some objects. In another implementation, randomization values may be assigned to different illustrations (e.g., such as multiple tree illustrations that make up a forest) to limit observable patterns among the illustrations that may lead to the illustrations appearing to be carbon copies.

The database 112 is configured to store files and/or data usable to render illustrations. By way of example, the rendering engine 104 may be configured to access data describing behaviors of objects from the database 112. Alternatively, the rendering engine 104 may update and/or store data corresponding to an illustration in the database 112 and/or maintain data that describe behaviors of different objects corresponding to illustrations to be rendered.

Although the rendering engine 104 is illustrated as being implemented on the computing device 102 it should be readily apparent that other implementations are also contemplated in which the rendering engine 104 is implemented on a separate device such as a remote server, a local server, or other remote computing device. Further, although illustrated as being provided by a computing device 102 in a desktop configuration, a variety of other configurations are also contemplated, such as remotely over a network 114 as part of a web platform as further described in relation to FIG. 7.

Regardless of where implemented, the rendering engine 104 is representative of functionality that is configured to generate an illustration by assigning light values and giving inheritance of value to each object's children based on their qualification.

Figure 2:
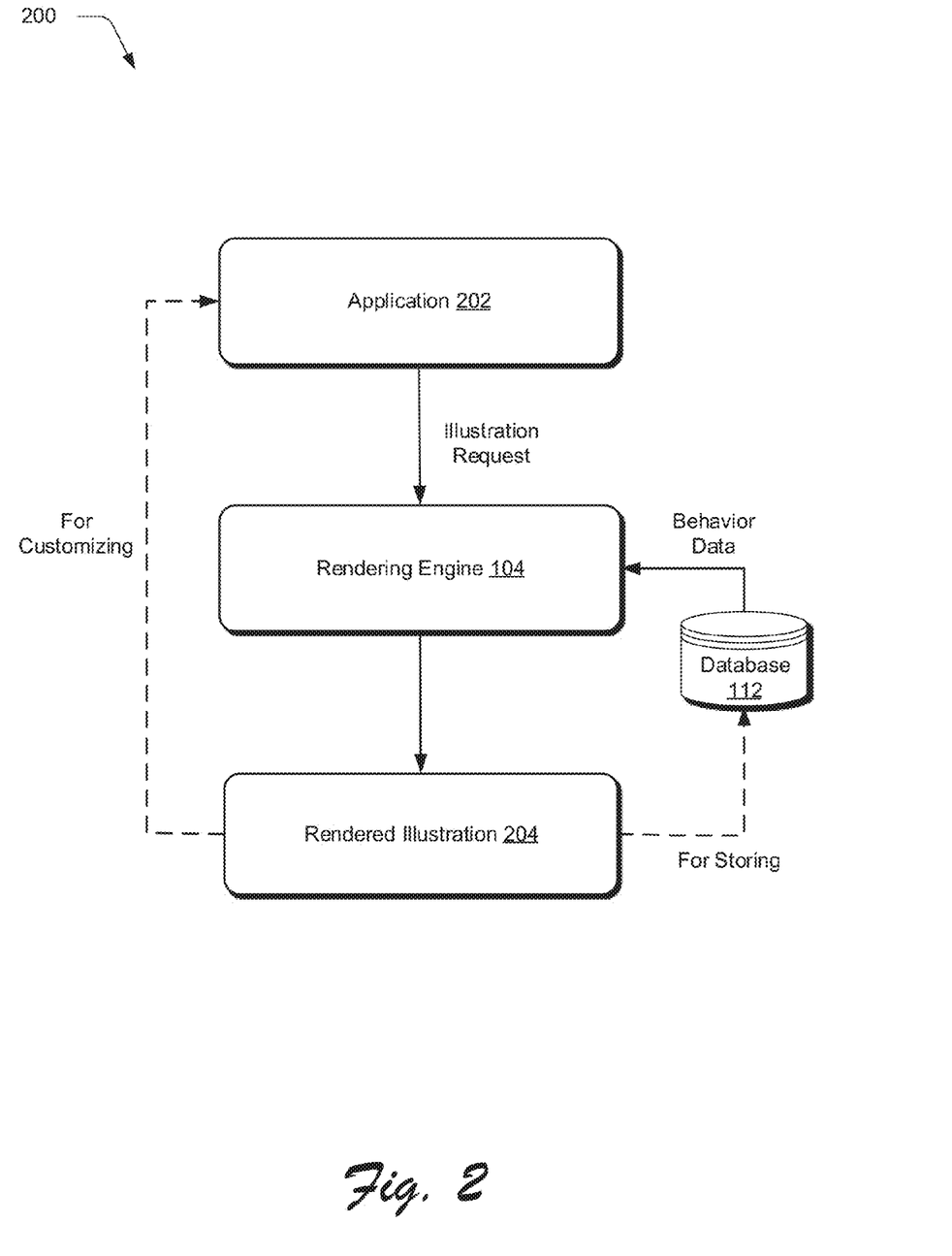
FIG. 2 depicts generally an example implementation in which a rendering engine of FIG. 1 renders an illustration.

FIG. 2 depicts generally at 200 a system in an example implementation in which the rendering engine 104 of FIG. 1 renders an illustration. As represented in FIG. 2, an application 202 sends an illustration request to the rendering engine 104 which generates a rendered illustration 204. By way of example and not limitation, the application 202 may be configured as an image editor application, one example of which is Adobe Photoshop®. Other content and image editor applications are also contemplated. In some implementations, the illustration request may be caused by a user providing an indication of a desired illustration via the application 202. For example, the user may select a type of illustration desired from a menu included in the application 202.

Responsive to receiving the illustration request, the rendering engine 104 may access behavior data from database 112. While database 112 is represented as being separate from the rendering engine 104, in some implementations, the database 112 may be included as part of the rendering engine 104. Alternatively, the rendering engine 104 may access behavior data from a local or remote memory. The rendering engine 104 uses the behavior data to assign light values to objects that define the illustration to be rendered. For instance, the behavior data may correspond to object behaviors and be usable to assign a light variable and/or light values as described herein. In one implementation, the rendered illustration 204 may represent a tree and include the objects illustrated in FIGS. 3A and 3B. Additional details regarding these objects and their behaviors are described in relation to FIGS. 3A and 3B. In other example implementations, the rendered illustration 204 may represent a cloud, smoke, an explosion, shrubs, bushes, plants, flowers, and the like. Even if the object, such as smoke, doesn't have a clearly defined hierarchy of related objects, an algorithm can assign a hierarchy of parent and child objects based on the smoke's shape.

The rendered illustration 204 may be used in a variety of ways. For example, it may be stored in the database 112, may be stored in local or remote memory, and/or may be exposed to an application for customizing. In one or more implementations, the rendered illustration 204 is stored locally in storage at the computing device 102. In addition or alternatively, the rendered illustration 204 may be stored in, and/or be accessible from, storage remote from the computing device 102, such as in a remote database or a remote server.

The rendered illustration 204 may be exposed to application 202 such that features of the rendered illustration 204 may be manipulated or modified. For instance, features available for manipulation may include light direction, camera tilt, an amount of leaves, a color of leaves, a color of branches, a season for displaying the tree, presence of wind to name a few. In addition or alternatively, the application 202 may include options to cause the rendered illustration 204 to appear flat (e.g., less contrast and fewer colors) and/or noised e.g., more contrast. Enabling features to be available for manipulation may include exposing parameters corresponding to the object behaviors to the application 202.

FIG. 3A depicts an example illustration 300 rendered via the rendering engine 104 by employing techniques described herein. A variety of different operations may be employed to render the example illustration 300. Examples of these operations may include but are not limited to generating image objects that collectively represent a desired object or illustration, ascertaining behaviors for each of the image objects, using a combination of the behaviors to represent light levels for the image objects, and/or rendering an illustration to include the image objects and their corresponding light levels.

As shown in FIG. 3A the example illustration 300 includes one or more trunk objects 302, one or more branch objects (and sub-branch objects) 304, and one or more leaf objects 306. These objects may represent image objects that together define the example illustration 300. Here, light values for the trunk object 302 may be calculated and/or assigned and subsequently used to determine light values for the branch objects 304. In this way, the example illustration 300 is rendered by calculating and/or assigning the light levels 'inside out' instead of determining the light information from 'outside' as in typical 3D calculations that rely on ray tracing or ray casting.

Light values assigned to the branch objects 304 may depend on a combination of behaviors. Behaviors may be determined using a variety of different operations. Examples of these operations may include identifying characteristics of the subject matter to be rendered. For instance, when the subject matter to be rendered is a tree, the following characteristics may be identified: a tree has one or more trunks, the trunk becomes thinner as leaves the ground, a trunk has multiple branches that do not have leaves, some branches (and sub-branches that leave the branch, not shown) are straight while others change direction, branches attached to the trunk tend to have multiple sub-branches and no leaves, and the like. These characteristics may form the behaviors that are usable to determine a light value and/or a light variable.

Another example operation to determine behaviors may include comparing a length, a location, and/or an orientation of an object relative to another object. Comparing a length of one branch object 304 relative to another may result in determining that leaves associated with shorter branches are to receive less light value than leaves associated with longer branches. For instance, the example structure 350 in FIG. 3B demonstrates that, comparing a location of leaf objects 352 relative to leaf objects 354 and 356 may result in the leaf objects 352 closer to the trunk object 358 receiving a value corresponding to a lower probability of light than those further from the trunk object 358 e.g., to represent ambient occlusion. In this example, the leaf objects 354 furthest from the trunk object 358 may not receive the effect of ambient occlusion from other leaves and are assigned a high probability of light and more likely get some highlight based on the comparison of the branch length rather than based on a comparison with the directional light source. Accordingly, the rendering techniques described herein do not rely on ray tracing or ray casting from a light source, such as the directional light source.

Figure 3B:
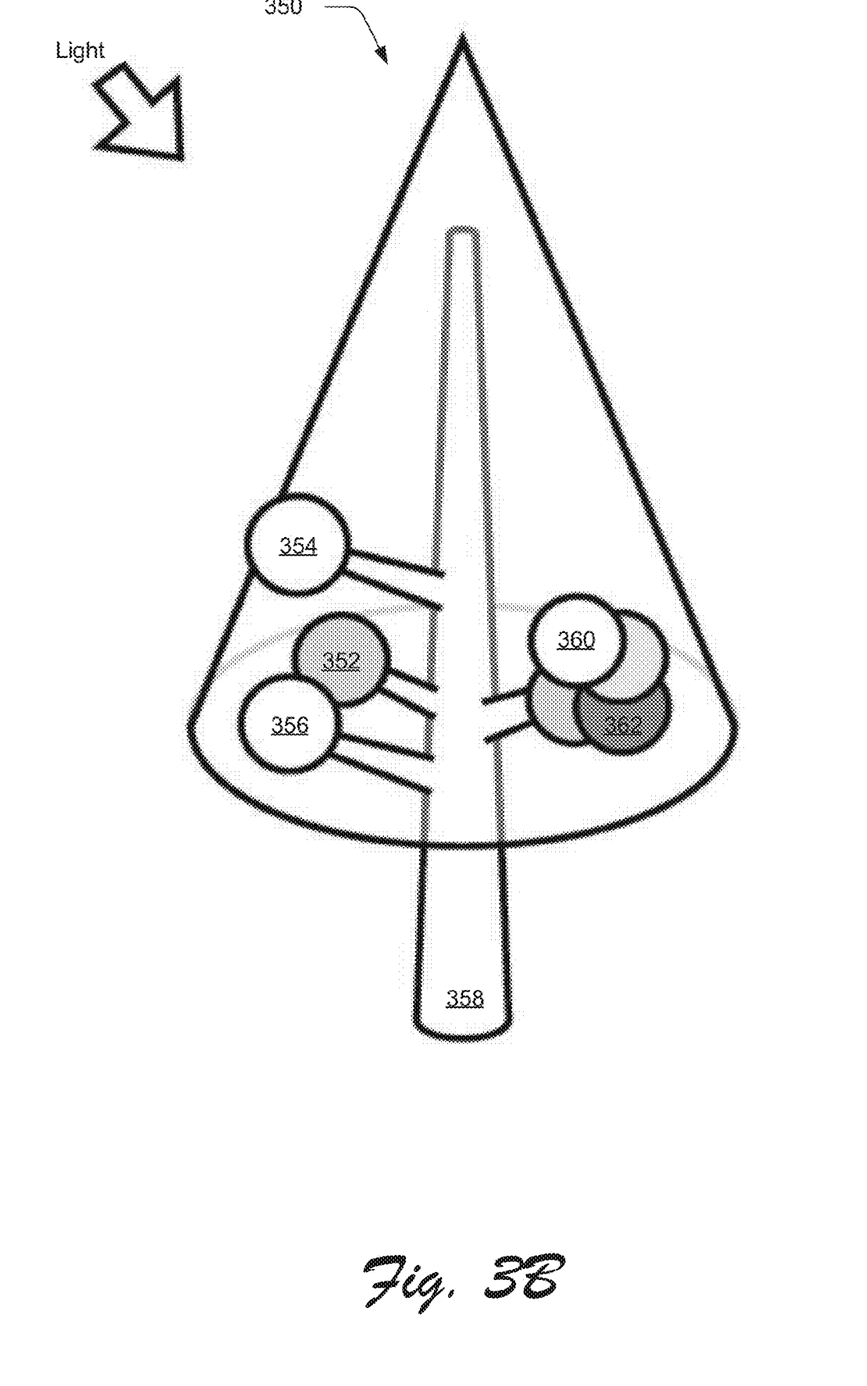
FIG. 3B depicts an example structure that is usable to demonstrate how behaviors of objects are determined in an example implementation.

Additionally or alternatively, comparing a location of leaf objects 360 relative to leaf objects 362 may result in the leaf objects 360 closest to the light source receiving a value corresponding to a higher probability of light than those farther from the light source e.g., to represent form shadow. Thus, the leaf objects 360 closest to the light source may receive a value corresponding to a probability of light based on estimating the light variation among assumed cluster leaves shape instead of tracing the ray from the light source to each leaf. Leaf objects 306, 352, 354, 356, 360, and 362 may be representative of a single leaf or a cluster of leaves. Each cluster of leaves may include an overall shape and/or orientation. Thus, a hierarchy of related objects may include parent and child relationships between single objects, a cluster of objects, or a combination thereof.

Referring back to FIG. 3A, leaf objects 306 may be rendered with a degree of randomness to determine the shape of a cluster. Leaf objects of a particular branch, for example, may follow a direction of the branch, or may be randomized. In one specific example, the leaf objects 306 may be randomized, or further randomized, as a result of receiving an indicator to randomize the example illustration 300 from a user interface or application. Another example of rendering objects with a degree of randomness is to assign a randomness value based on an angle of departure of a branch object 304 relative to the trunk object 302. A randomness value to be assigned to the branch object 304, for instance, may be determined in part by analyzing the sub-branches and/or cluster of leaves that come from or are otherwise associated with the branch object 304. For instance, if this branch happens to grow toward a camera or viewing position, the appearance of the branch would be shorter to depict its foreshortening relative to another branch that does not grow towards the camera or viewing perspective. The sub-branches from this parent branch would also look shorter for they likely follow the similar direction of their parent, which is toward the camera. Thus, a length of the branch object 304 relative to the trunk object 302 and/or another branch may also be considered prior to rendering.

Although some of the identified characteristics may be common among varieties of trees, behaviors among the variety of trees may differ. Different varieties of trees may have different lengths, locations, and/or orientations of objects relative to other objects, therefore at least some behaviors used to render an ash tree illustration may differ from behaviors used to render an aspen tree illustration. The techniques described herein may be represented in a program that processes different behaviors as parameters and uses common modules to depict the same characteristics among all trees.

Various operations such as calculating, assigning, comparing, determining, receiving, storing, generating, identifying, and so forth performed by various modules are discussed herein. It should be appreciated that the various modules may be configured in various combinations with functionality to cause these and other actions to be performed. Functionality associated with a particular module may be further divided among different modules and/or the functionality represented by multiple modules may be combined together into a single logical module. Moreover, a particular module may be configured to cause performance of action directly by the particular module. In addition or alternatively the particular module may cause particular actions by invoking or otherwise accessing other components or modules to perform the particular actions (or perform the actions in conjunction with that particular module).

Example Procedures

The following discussion describes rendering techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. Moreover, any one or more blocks of the procedure may be combined together or omitted entirely in different implementations. Moreover, blocks associated with different representative procedures and corresponding figures herein may be applied together. Thus, the individual operations specified across the various different procedures may be used in any suitable combinations and are not limited to the particular combinations represented by the example figures. In portions of the following discussion, reference may be made to the examples of FIGS. 1-3.

Figure 4:
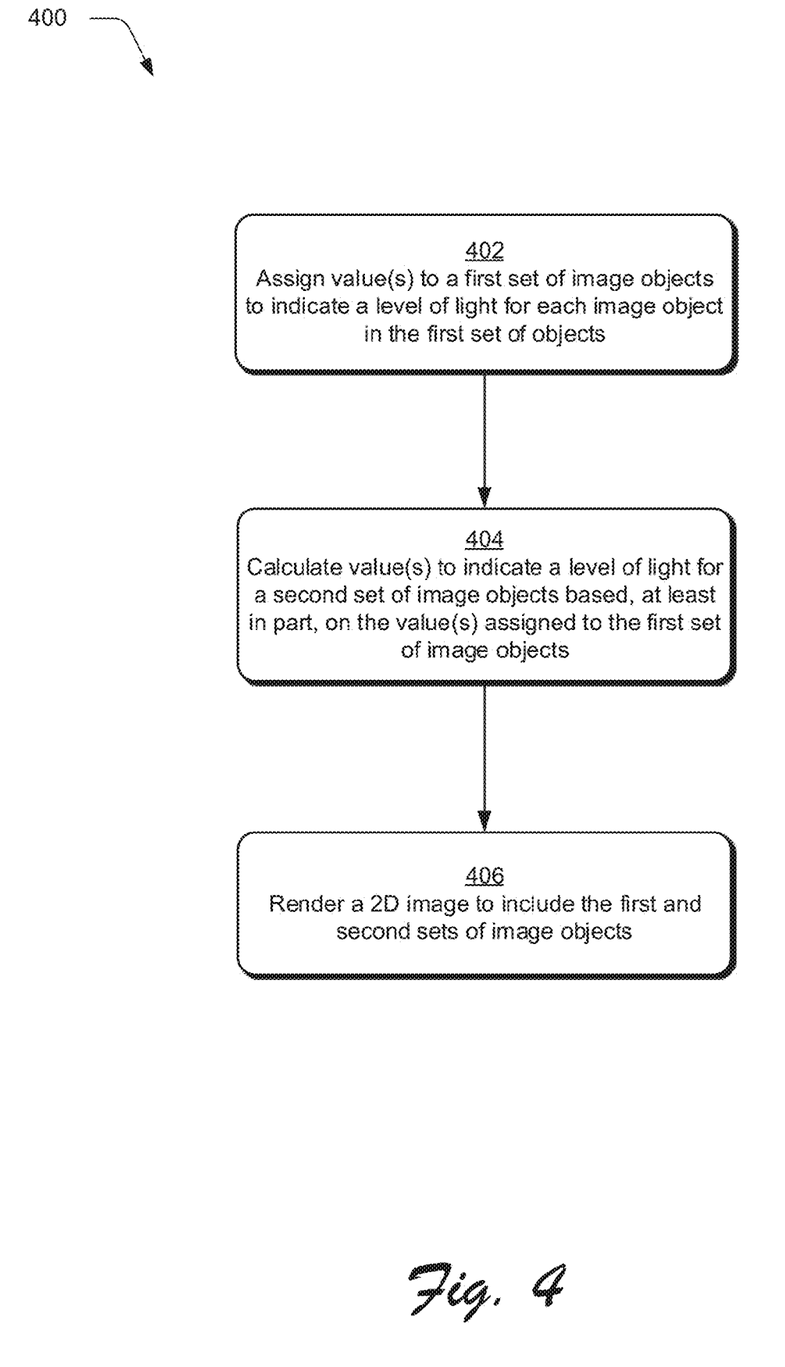
FIG. 4 is a flow diagram depicting a procedure in an example implementation in which a rendering engine renders a 2D image by assigning light values to first and second sets of objects.

FIG. 4 depicts a procedure 400 in an example implementation in which a rendering engine renders a 2D image by assigning light values to first and second sets of objects. Value(s) are assigned to a first set of image objects to indicate a level of light for each image object in the first set of image objects (block 402). For example, the rendering engine 104 may assign values to indicate a level of light to the first set of image objects using any of the techniques described herein. The rendering engine 104, for instance, may assign a brightness value and/or a shadow value for each image object. In one or more implementations, the values are assigned to the first set of image objects based on a first light source that illuminates the entire image object and a second light source that illuminates a portion of the image object.

Values are calculated to indicate a level of light for a second set of image objects based, at least in part, on the values assigned to the first set of image objects (block 404). The rendering engine 104, for instance, may calculate values for the second set of image objects by calculating a light variable for each of the second image objects based on its qualification (e.g., size, location, orientation, and/or direction). The light variables may be determined by ascertaining behaviors that describe how the second image objects relate to the first set of image objects. The ascertained behaviors may describe, for example, that a distance of the second set of image objects to a light source (e.g., the second light source) is less than a distance of the first set of image objects to the light source and/or that a location of the second set of image objects to a light source (e.g., the second light source) is closer than a location of the first set of image objects to the light source.

A 2D image is rendered to include the first and second sets of image objects (block 406). For instance, the rendering engine 104 may render the 2D image responsive to assigning and/or calculating values indicative of a level of light to the first and second sets of image objects. In one implementation, parameters associated with the 2D image may be exposed to an application to enable the application to customize the 2D image.

Figure 5:
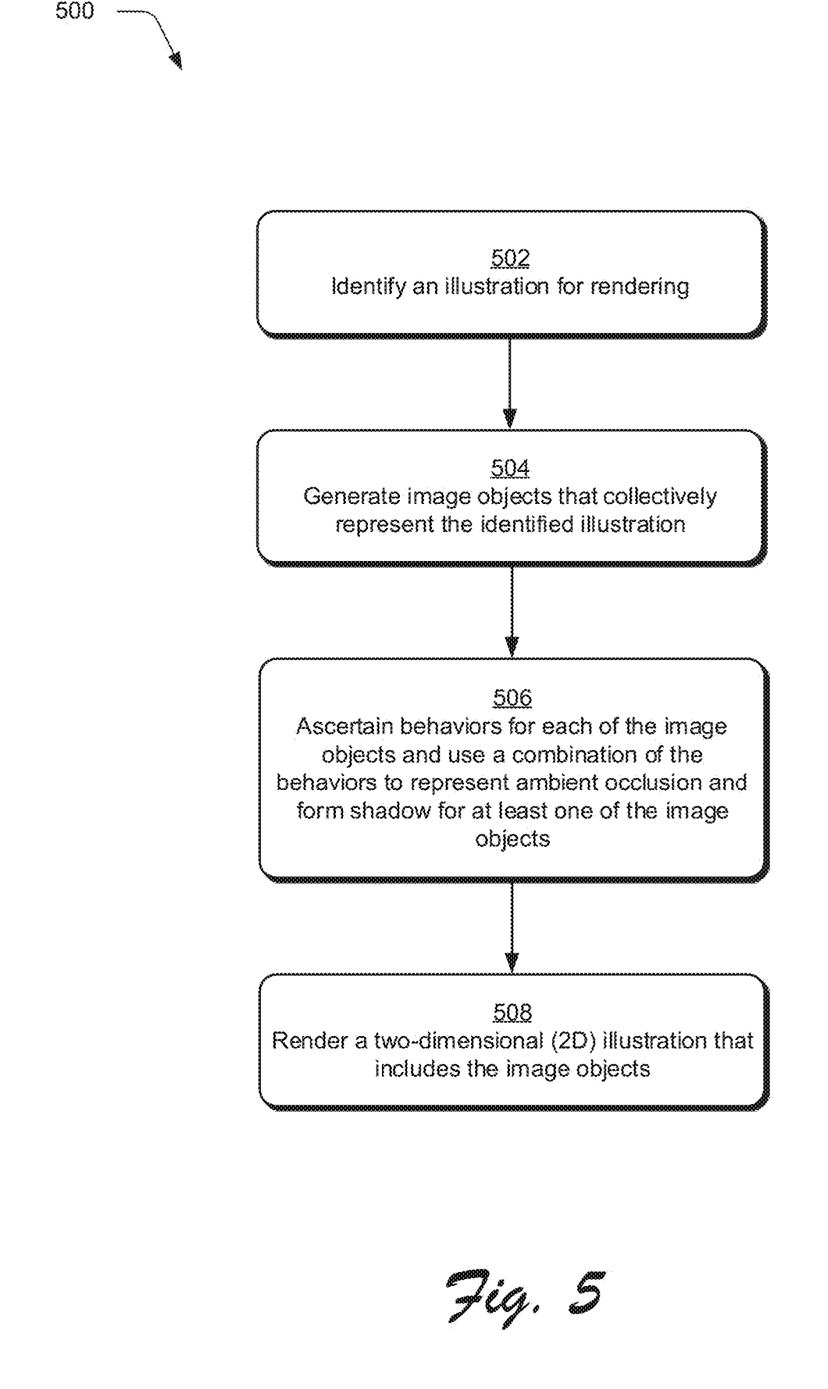
FIG. 5 is a flow diagram depicting a procedure in an example implementation in which a rendering engine renders a 2D illustration by using a combination of behaviors.

FIG. 5 is a flow diagram depicting a procedure 500 in an example implementation in which a rendering engine renders a 2D illustration by using a combination of behaviors. An illustration for rendering is identified (block 502). For example, the rendering engine 104 may receive an input that indicates a selection of a particular type of illustration to be rendered. In one specific implementation, the input may be received from an image editor application and indicate a selection to render a particular type of tree. Image objects that collectively represent the identified illustration are generated (block 504). For instance, the rendering engine 104 may generate a trunk object, a branch object, and/or a leaf object in order to render the identified illustration. In one implementation, generating these objects may include foreshortening one or more of the objects so that the rendered illustration appears more realistic.

Behaviors for each of the image objects are ascertained and a combination of the behaviors are used to represent ambient occlusion and form shadow for at least one of the image objects (block 506). The rendering engine 104 may use a combination of the behaviors to represent ambient occlusion, highlight, and/or form shadow based on operations performed by the behavior module 108, some examples of which were discussed above in relation to FIGS. 1-4.

Figure 6:
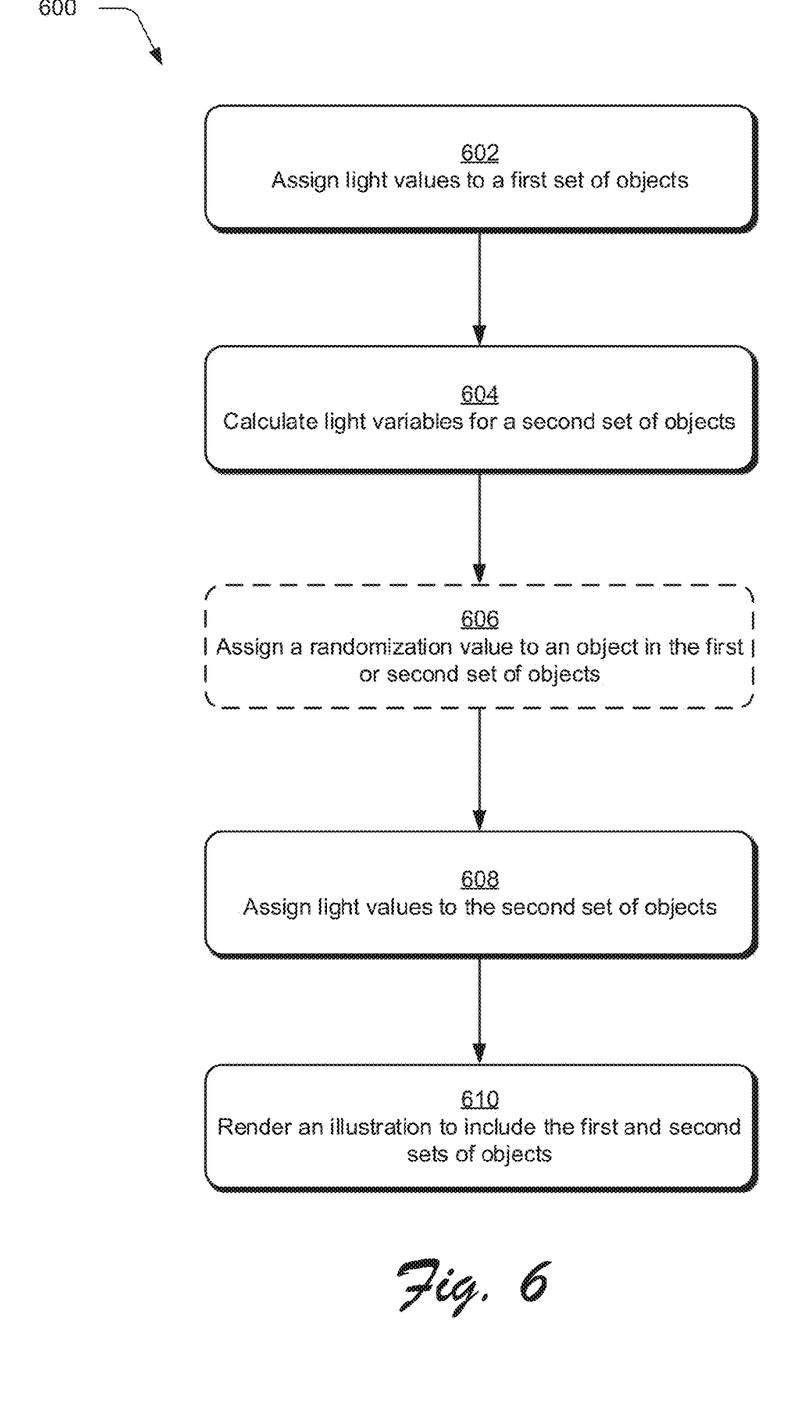
FIG. 6 is a flow diagram depicting a procedure in an example implementation in which a rendering engine renders an illustration by calculating light variables for objects that make up the illustration.

FIG. 6 is a flow diagram depicting a procedure 600 in an example implementation in which a rendering engine renders an illustration by calculating light variables for objects that make up the illustration. Light values are assigned to a first set of objects (block 602). For example, the rendering engine 104 may assign light values as discussed herein in relation to FIGS. 1-5 and elsewhere. In some implementations, the first set of objects includes one or more trunk objects 302 or one or more branch objects 304.

Light variables are calculated for a second set of objects (block 604). For example, the rendering engine 104 may calculate light variables for one or more branch objects 304 or one or more leaf objects 306. The light variables may be calculated in a variety of ways. For example, the rendering engine 104 may calculate the light variables based on the object's qualification and/or behaviors that describe a relationship between objects included in the first and second sets of objects.

In some implementations, a randomization value is assigned to an object in the first or second set of objects (block 606). For instance, the rendering engine 104 may employ the randomization module 110 to assign a randomization value to a leaf object, such as leaf object 306, to cause the leaf object to vary by shape, orientation, and/or light relative to another leaf object. The randomization value assigned to the leaf object in this example may include a numeral, a symbol, or other character that, when assigned, provides an indication to vary an orientation of the leaf object relative to an orientation of another leaf object.

Light values are assigned to the second set of objects (block 608). For example, the rendering engine 104 may assign light values to the second set of objects that represent a combination of the light values assigned to the first set of objects based on its qualification, and a respective light variable (and further the randomization value in implementations when a randomization value is assigned). In one specific example, the rendering engine 104 may assign light values to a leaf object 306 that represent a combination of the light values assigned to a branch object 304 and the light variable calculated for the leaf object 306. In this specific example, the light values are assigned independent of determining a light source relative to the objects. An illustration is then rendered to include the first and second sets of objects (block 608).

Example System and Device

Figure 7:
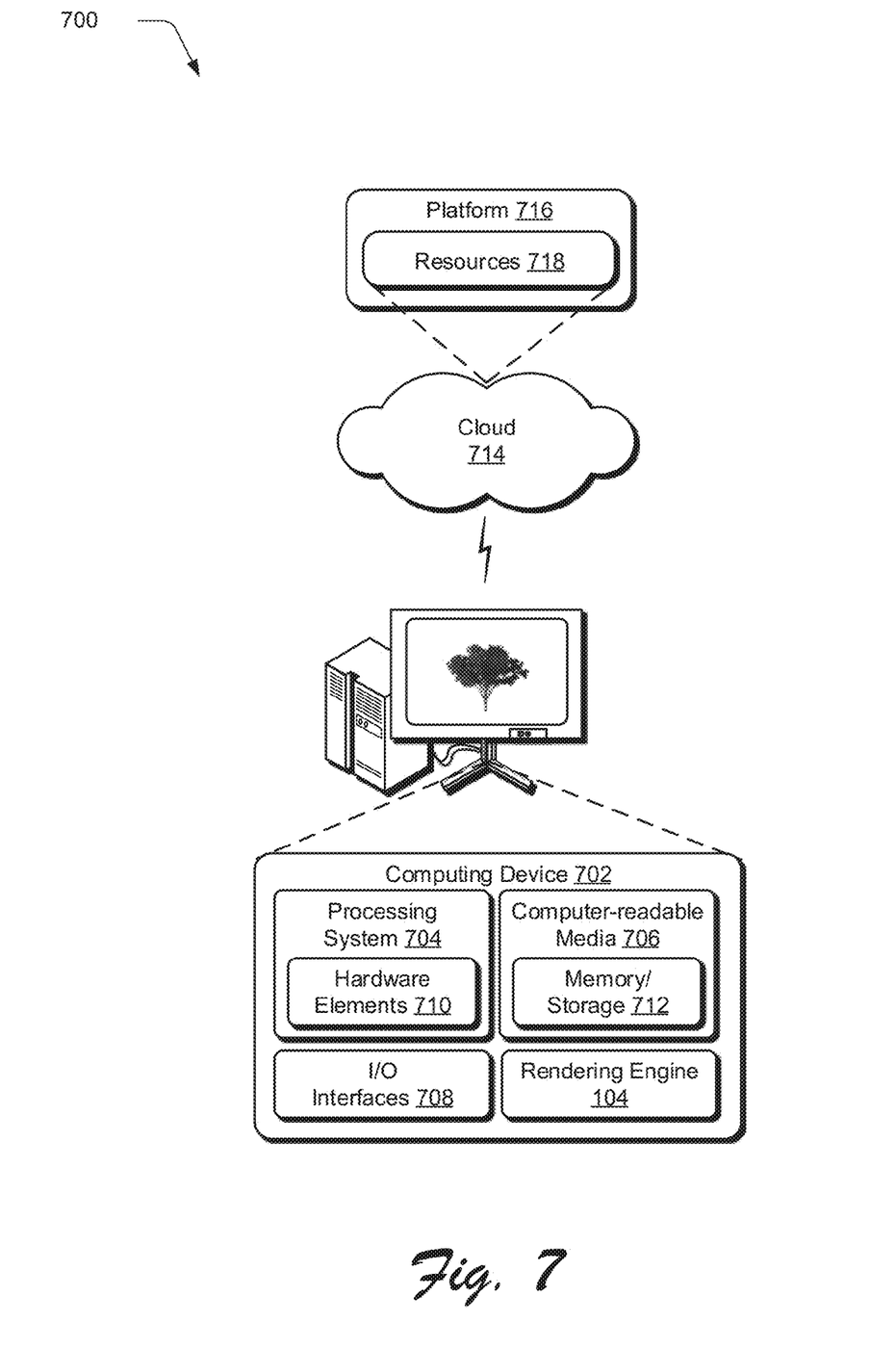
FIG. 7 illustrates an example system including an example device that is representative of one or more computing systems and/or devices that may implement the various techniques described herein.

FIG. 7 illustrates an example system 700 that, generally, includes an example computing device 702 that is representative of one or more computing systems and/or devices that may implement the various techniques described herein. This is illustrated through inclusion of the rendering engine 104, which may be configured to render illustrations. The computing device 702 may be, for example, a server of a service provider, a device associated with a client (e.g., a client device), an on-chip system, and/or any other suitable computing device or computing system.

The example computing device 702 as illustrated includes a processing system 704, one or more computer-readable media 706, and one or more I/O interface 708 that are communicatively coupled, one to another. Although not shown, the computing device 702 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 704 is representative of functionality to perform one or more operations using hardware. Accordingly, the processing system 704 is illustrated as including hardware element 710 that may be configured as processors, functional blocks, and so forth. This may include implementation in hardware as an application specific integrated circuit or other logic device formed using one or more semiconductors. The hardware elements 710 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 706 is illustrated as including memory/storage 712. The memory/storage 712 represents memory/storage capacity associated with one or more computer-readable media. The memory/storage component 712 may include volatile media (such as random access memory (RAM)) and/or nonvolatile media (such as read only memory (ROM), Flash memory, optical disks, magnetic disks, and so forth). The memory/storage component 712 may include fixed media (e.g., RAM, ROM, a fixed hard drive, and so on) as well as removable media (e.g., Flash memory, a removable hard drive, an optical disc, and so forth). The computer-readable media 706 may be configured in a variety of other ways as further described below.

Input/output interface(s) 708 are representative of functionality to allow a user to enter commands and information to computing device 702, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 702 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 702. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 702, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 710 and computer-readable media 706 are representative of modules, programmable device logic and/or fixed device logic implemented in a hardware form that may be employed in at least some implementations to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 710. The computing device 702 may be configured to implement particular instructions and/or functions corresponding to the software and/or hardware modules. Accordingly, implementation of a module that is executable by the computing device 702 as software may be achieved at least partially in hardware, e.g., through use of computer-readable storage media and/or hardware elements 710 of the processing system 704. The instructions and/or functions may be executable/operable by one or more articles of manufacture (for example, one or more computing devices 702 and/or processing systems 704) to implement techniques, modules, and examples described herein.

The techniques described herein may be supported by various configurations of the computing device 702 and are not limited to the specific examples of the techniques described herein. This functionality may also be implemented all or in part through use of a distributed system, such as over a "cloud" 714 via a platform 716 as described below.

The cloud 714 includes and/or is representative of a platform 716 for resources 718. The platform 716 abstracts underlying functionality of hardware (e.g., servers) and software resources of the cloud 714. The resources 718 may include applications and/or data that can be utilized while computer processing is executed on servers that are remote from the computing device 702. Resources 718 can also include services provided over the Internet and/or through a subscriber network, such as a cellular or Wi-Fi network.

The platform 716 may abstract resources and functions to connect the computing device 702 with other computing devices. The platform 716 may also serve to abstract scaling of resources to provide a corresponding level of scale to encountered demand for the resources 718 that are implemented via the platform 716. Accordingly, in an interconnected device embodiment, implementation of functionality described herein may be distributed throughout the system 700. For example, the functionality may be implemented in part on the computing device 702 as well as via the platform 716 that abstracts the functionality of the cloud 714.

CONCLUSION

Although the techniques have been described in language specific to structural features and/or methodological acts, it is to be understood that the subject matter defined in the appended claims is not necessarily limited to the specific features or acts described. Rather, the specific features and acts are disclosed as example forms of implementing the claimed subject matter.

What is claimed is:

1. A method implemented by a computing device, the method comprising:
   rendering a two-dimensional (2D) image that includes first and second sets of image objects in which a distance of the second set of image object to a light source is less than a distance of the first set of image objects to the light source, the rendering including:
   assigning one or more values to the first set of image objects to indicate a level of light for each image object in the first set of objects;
   calculating one or more values to indicate a level of light for the second set of image objects by combining the one or more values assigned to the first set of image objects and a light variable, the light variable being determined based, at least in part, on a qualification of an object in the second set of image objects; and
   rendering the 2D image to include the first and second sets of image objects.

2. A method as described in claim 1, wherein the rendered 2D image represents a tree.

3. A method as described in claim 1, the assigned one or more values and the calculated one or more values including a first value that represents ambient occlusion and a second value that represents form shadow.

4. A method as described in claim 1, the 2D image appearing to represent a three-dimensional image.

5. A method as described in claim 1, the light variable being further determined based, at least in part, dependent on behaviors that describe a relationship between the first and second sets of image objects.

6. A method as described in claim 1, the assigned one or more values to indicate the level of light for the first set of image objects including a brightness value and a shading value.

7. A method as described in claim 1, the 2D image being rendered without determining a corresponding three-dimensional image.

8. A method as described in claim 1, the first and second sets of image objects including one or more of: a trunk object, a branch object, and a leaf object.

9. A method as described in claim 1, the rendering being performed, at least in part, by a 2D rendering engine.

10. A method as described in claim 1, wherein the qualification of the object in the second set of image objects includes a size, a location, a direction, or a randomization.

11. One or more non-transitory computer readable storage media comprising instructions stored thereon that, responsive to execution by a computing device, causes the computing device to perform operations comprising:
   receiving an indication to render an illustration via an application of the computing device, the illustration configured for insertion into a project as one of multiple illustrations included in the project;
   identifying the illustration for rendering responsive to the received indication;
   generating image objects that collectively represent the identified illustration;

ascertaining behaviors for each of the image objects and using a combination of the behaviors to represent ambient occlusion and form shadow for at least one of the image objects; and rendering a two-dimensional (2D) illustration that includes the image objects.

12. One or more non-transitory computer readable storage media as described in claim 11, wherein the ascertained behaviors describe a relationship between two or more image objects.

13. One or more non-transitory computer readable storage media as described in claim 11, further comprising using the combination of behaviors to represent highlight for the image objects.

14. One or more non-transitory computer readable storage media as described in claim 11, further comprising enabling modification of the 2D illustration by exposing parameters corresponding to the 2D illustration to a graphical user interface.

15. One or more non-transitory computer readable storage media as described in claim 11, further comprising assigning a randomization value to at least one image object and using the randomization value in addition to the combination of the ascertained behaviors to represent the ambient occlusion or the form shadow for the at least one image object.

16. One or more non-transitory computer readable storage media as described in claim 11, wherein the ascertained behaviors for at least one of the image objects describes a length, a location, an orientation, or a change in direction of the at least one image object relative to another image object.

17. One or more non-transitory computer readable storage media as described in claim 11, wherein the illustration is a tree and the image objects include two or more of a trunk, a branch, and a leaf.

18. A computing device comprising one or more modules implemented at least partially in hardware, the one or more modules configured to perform operations comprising:

rendering a two-dimensional (2D) image by:
assigning one or more values to a first set of image objects to indicate a probability of light for each image object in the first set of objects relative to a light source;
calculating one or more values to indicate a probability of light for a second set of image objects based, at least in part, on the one or more values assigned to the first set of image objects, a location of the second set of image objects to the light source being closer to the light source than a location of the first set of image objects, the calculating the one or more values for the second set of image objects inheriting the one or more values assigned to the first set of image objects and assigning a light variable to the inherited values; and
rendering the 2D image to include the first and second sets of image objects.

19. A computing device as described in claim 18, further comprising randomizing location or orientation of one or more image objects.

20. A computing device as described in claim 18, the light variable being determined based, at least in part, on a qualification of an object in the second set of image objects.

* * * * *

UNITED STATES PATENT AND TRADEMARK OFFICE
CERTIFICATE OF CORRECTION

| | |
|---|---|
| PATENT NO. | : 9,495,785 B2 |
| APPLICATION NO. | : 14/515295 |
| DATED | : November 15, 2016 |
| INVENTOR(S) | : Daichi Ito |

It is certified that error appears in the above-identified patent and that said Letters Patent is hereby corrected as shown below:

In the Claims

Column 14, Line 38, after "at least in part," delete "dependent", therefor.

Signed and Sealed this
Eleventh Day of April, 2017

Michelle K. Lee
*Director of the United States Patent and Trademark Office*